Patented Jan. 12, 1932　　　　　　　　　　　　　　1,841,235

UNITED STATES PATENT OFFICE

HERBERT A. WINKELMANN, OF AKRON, OHIO, ASSIGNOR TO THE PHILADELPHIA RUBBER WORKS COMPANY, OF AKRON, OHIO, A CORPORATION OF DELAWARE

PINE TAR PRODUCT AND METHOD OF MAKING SAME

No Drawing.　　　　Application filed October 28, 1927. Serial No. 229,540.

This invention relates to a composition of matter derived from pine tar oil and particularly to a composition prepared by polymerization of pine tar in the presence of a catalyst and to a method of making such compositions.

Commercial pine tar oils, and the so-called medium pine tar oil and heavy pine tar oil obtained therefrom, are relatively free liquids having a somewhat disagreeable odor and have to date found no extensive use in the industries. I have found that these pine tar oils may be polymerized to a product which is very viscous or pitchy in character and that in this form it may be used in a number of industrial operations and particularly as a compounding ingredient in the manufacture of rubber goods.

In carrying out the process of this invention, I add to the pine tar oil a catalyst of polymerization, such as sulfur, sulfuric acid, or other catalyst, and maintain the oil at a temperature around 90° C. for 24 hours, which may be conveniently done upon a water or steam bath. During the heating operation jets of air are blown through the pine tar liquid and the oil is by this means changed to a viscous liquid or pitchy mass. The character of this change is not definitely known but is believed to be largely polymerization accompanied to some extent by oxidation. The result of the polymerization in this case is to increase the viscosity of the oil, which change may also be influenced by driving off from the pine tar oil some of the more volatile constituents, where the polymerizing action is not carried out under reflux.

The following examples are herein given to illustrate the principles of this invention, which however, is not limited to the specific subject matter of these examples.

Example 1.—The ingredients to be treated, comprising 100 parts by weight of pine tar oil and 2 parts of sulfur, were placed in a flask equipped with an efficient condenser to return to the flask any of the constitutents of the pine tar oil which volatilized during the heating. The pin tar oil and sulfur admixture were then heated to 90° C. and maintained at this temperature for 24 hours, air being blown through the admixture during this period. The yield was found to be 99% and the resulting product to be a liquid of much greater viscosity than the original pine tar oil.

Example 2.—Medium pine tar oil was admixed with 2% sulfur and heated under reflux at 90° C. and air blown therethrough for 24 hours as in the preceding example. A more viscous product having a less odor than the product of Example 1 was thus formed.

Example 3.—The ingredients of Example 1 were treated under reflux as hereinbefore described, but the blowing was continued for 60 hours instead of 24 hours. A yield of 97% was obtained and the product was found to be much more viscous than that of Example 1.

Example 4.—It has also been found possible to secure more viscous or pitchy products by removing by distillation the lighter constituents prior to subjecting the pine tar oil to a polymerizing action. Thus, a quantity of commercial pine tar oil was heated in a suitable receptacle until 10% of the lighter oils had been distilled off. The residue was then mixed with 2% of sulfur and heated under reflux to 90° C. for 60 hours, air being blown therethrough during this period. The resulting product was more viscous than the products of the preceding examples having a consistency of thick molasses.

Extensive experimentation of these products would seem to indicate that the polymerization which takes place during the above described treatment results in an increase of the higher blowing constituents of the pine tar. This is illustrated in the following examples:

Example 5.—A quantity of pine tar oil was placed in a still and heated slowly until a temperature of 300° C. was reached. Residue from the distillation which consisted of 62% of the original pine tar was found upon cooling to be a viscous material which flowed very slowly upon inverting its container.

Example 6.—A quantity of commercial pine tar and 2% of sulfur were heated under reflux to 90° C. and air blown therethrough for 24 hours. The blowing was then discontinued and the temperature of this material was gradually raised until it attained a temperature of 300° C., the vapors being permitted to escape. The residue which was 78.5% of the original pine tar oil, when cooled, was very much more viscous than the product of Example 5 and did not flow from its container when the latter was inverted. It is interesting to note that the product of Example 6 is much more viscous than that of Example 5, although the former contained 16½% more of the pine tar than the latter. This shows that as the result of polymerization the boiling points of the pine tar constituents have been greatly increased.

One advantage of the above described method resides in the fact that varying degrees of viscosity may be obtained by varying the blowing time. The result of this method of treatment is to effect an increase in the higher boiling constituents of the pine tar oil, accompanied by an increased viscosity. The process is capable of producing from free fluid commercial pine tar oil an extremely high yield of viscous and pitchy polymerized pine tar oil. The efficiency of the process is rather remarkable and the properties of the resulting polymerized pine tar oils such as to give them an extensive use in the industries.

It will be understood that numerous modifications and variations may be resorted to within the scope of this invention and I do not therefore wholly limit the claims hereof to the specific procedures or products described.

I claim:

1. The process of producing a viscous, pitchy material from pine tar oil, which comprises blowing air through pine tar oil at an elevated temperature in the presence of a small proportion of sulphur.

2. The process of producing a viscous, pitchy material from pine tar oil, which comprises heating pine tar oil to a temperature not in excess of 100° C., and blowing air therethrough in the presence of a small proportion of sulphur.

3. The process of producing a viscous, pitchy material from pine tar oil, which comprises heating pine tar oil, and blowing air therethrough in the presence of approximately 2% of sulphur.

4. The process of producing a viscous, pitchy material from pine tar oil, which comprises heating pine tar oil to a temperature not in excess of 100° C., adding approximately 2% sulphur, and blowing air through the heated mixture.

In witness whereof I have hereunto set my hand this 21st day of October, 1927.

HERBERT A. WINKELMANN.